INVENTORS P. W. JACOBSOHN
H. E. SCHUELER
BY
ATTORNEY

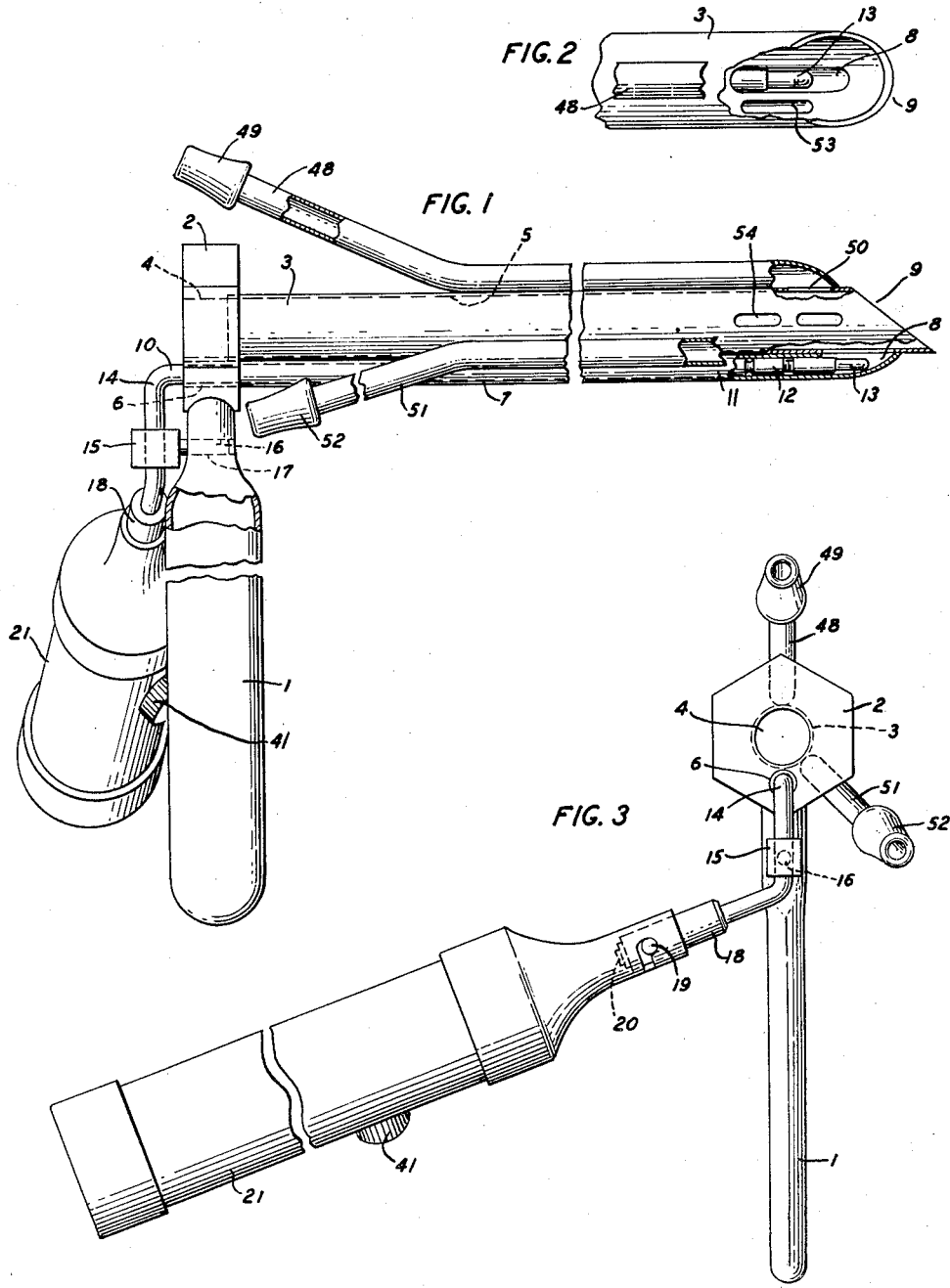

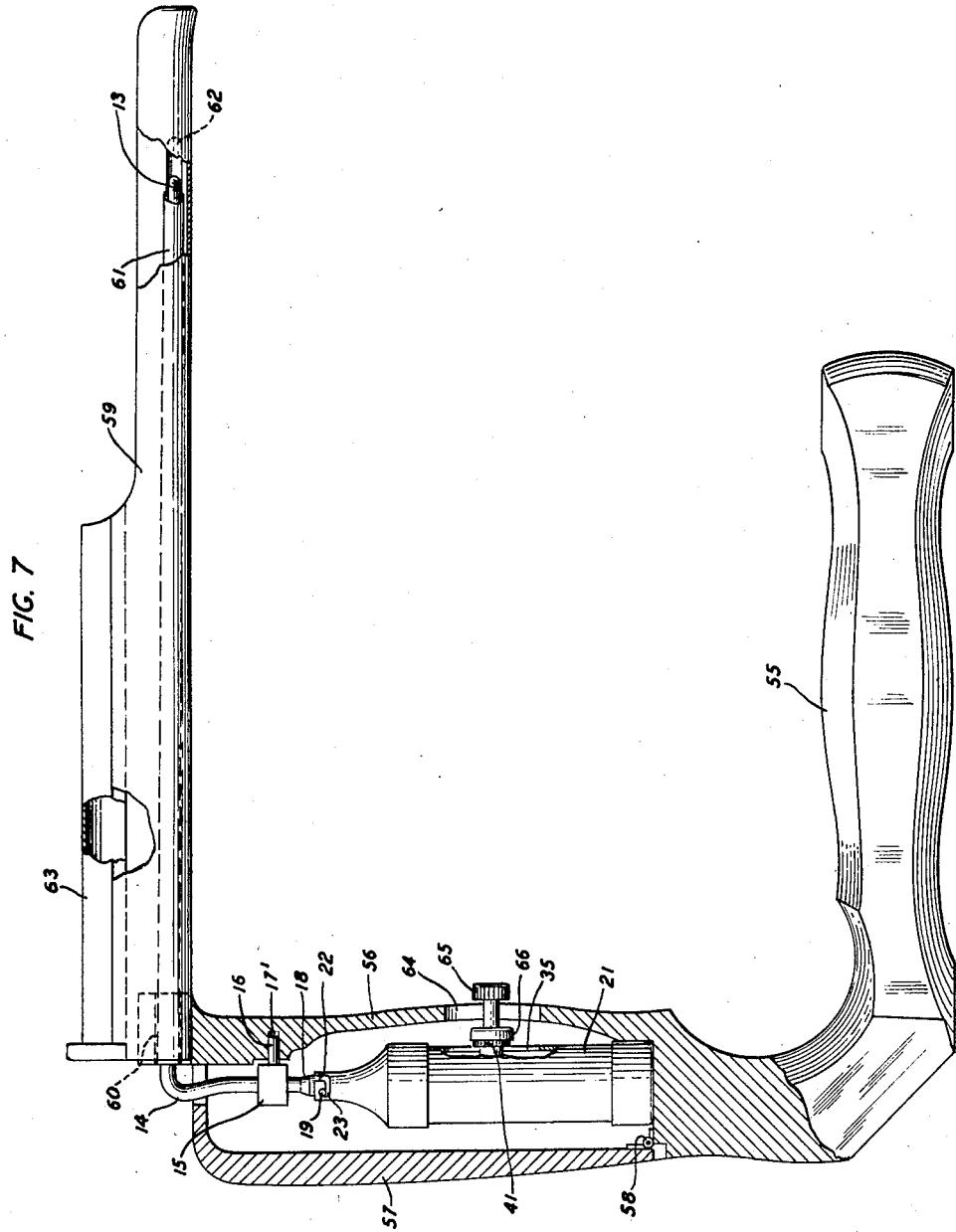

United States Patent Office 2,911,968
Patented Nov. 10, 1959

2,911,968

CAVITY EXAMINING INSTRUMENT WITH SELF-CONTAINED ILLUMINATING ROD AND SOURCE

Hassan E. Schueler, St. Albans, N.Y., and Peter W. Jacobsohn, Paramus, N.J.

Application July 6, 1955, Serial No. 520,231

1 Claim. (Cl. 128—6)

The instant invention relates to cavity examining instruments with a self-contained source from which the drain of energy for illumination may be varied in accordance with the required or desired degree of illumination.

The object of the instant invention is to provide adequate illumination within deep and narrow cavities of the human body, for example the bronchial tree, to inspect the latter from the exterior thereof from a position of the inspecting eye necessarily at some distance from the portion of the cavity being inspected, that is, for example, such instruments as bronchoscope, laryngoscopes, and the like.

A further object is to incorporate the electric source, furnishing energy to the incandescent light of the illuminating rod inserted into the examining instrument, to form a unit attached to or within the handle itself of the instrument so as to minimize and effectively eliminate any interference with the inspection operation.

Still a further object is to provide a compact, lightweight examining instrument having its built-in or readily attachable and replaceable power source for lighting the incandescent lamp in the form of a mechanically small unit and electrically provided with a sliding contact for the on and off actuation of the lamp, as also for providing variable illumination during the on actuation thereof under the direct control of the examiner, the doctor, himself.

In the prior art instruments of this general class, the source of illuminating energy was generally a portable, but rather large and cumbersome, battery box connected to the illuminating means of the instrument cords in which the control means were provided. The control means either had to be set in advance of inserting the instrument into the cavity, or by a nurse or other attendant under the direction of the examining doctor. In the alternative, the examining doctor might, while leaving the instrument inserted to the discomfort of the person being examined, remove his attention from the examination, set the control means, and then check the illumination by again looking into the instrument. That is, if unattended by a nurse, the doctor simply could not observe the effect of the light adjustment while making the adjustment. The marked feature of our invention is that now he can continuously observe the effect of varying the light control while actually varying it, cutting down appreciably on the time for the examination or operation and the duration of the patient's discomfort.

The foregoing, as well as other, objects, and the advantages and the features of the instant invention, will readily be apparent from the following detailed description of two illustrative embodiments of our invention in conjunction with the appended drawing in which:

Figure 1 is a side elevational view of a first illustrative embodiment of our invention in a cavity examining instrument, namely a bronchoscope, in which the regulatable source of electrical energy is external to and supported at the operating handle of the instrument;

Figure 2 is an enlarged top view of the remote end region of the Figure 1 embodiment;

Figure 3 is an end elevational view of the proximate end of such embodiment;

Figure 4:
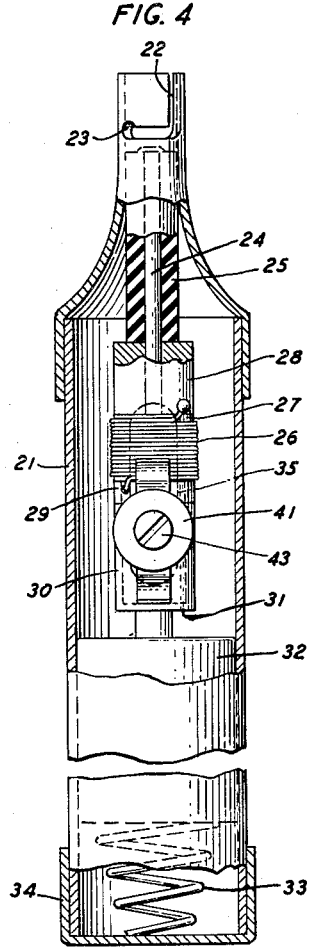
Figure 5:
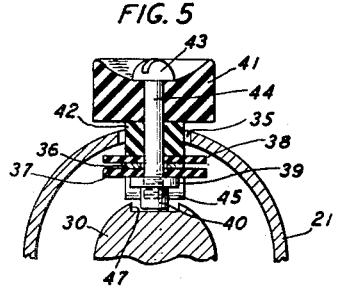
Figure 6:
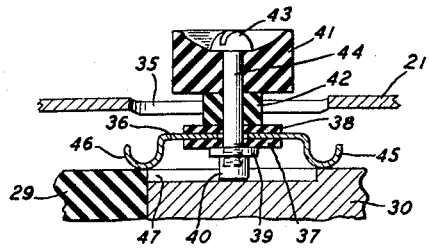

Figure 4 is an elevational view of the regulatable source of electrical energy and its housing, on an enlarged scale from that of Figure 1, with Figure 5 and 6 showing enlarged details in section through the slide contact and its immediately adjacent elements transverse to and parallel to the slot of the slide contact, respectively, and Figure 7 is an elevational view, partially in section, of a second illustrative embodiment of our invention in a laryngoscope, in which the regulatable souce of electrical energy is housed within the operating handle of the instrument.

The first illustrative embodiment of the cavity examining instrument of our invention in the form of a bronchoscope shown in Figure 1, comprises a formed handle 1 from the upper end 2 of which a hollow tube 3 extends substantially at right angles and of any required or convenient length, for example 17½ inches. An aperture 4 extends through the upper handle end 2 and registers with the longitudinal bore 5 of tube 3 of an appropriate diameter, for example 5/16 inch, for the insertion therethrough of an appropriate instrument such as a biopsic forceps or a telescope. Substantially vertically aligned with and below the aperture 4, a second aperture 6 of considerably smaller diameter extends through the handle upper end 2, and therethrough in turn extends a hollow tube 7 of an outside diameter snugly fitting through the aperture 6. The hollow tube 7 lies below tube 3 with its upper peripheral region adjacent to the lower peripheral region of tube 3, and preferably integral therewith, for substantially the entire length of tube 3 opening thereinto to form an elongated groove 8 in the remote end 9 thereof. As will be noted from Figures 1 and 2, the remote end of tube 3 is tapered outwardly at an angle of about 45 degrees from the top to the bottom of the tube wall.

Of an outer diameter readily slidable into tube 7, an illuminating rod 10, of metal and having embedded therein and insulated therefrom a central conductor 11 terminating at the remote end in a lamp socket 12 for receiving a miniature incandescent lamp 13, is of a length such that the lamp on complete insertion of the rod into the tube 7 will be in the elongated groove 8. Adjacent the near end, the illuminating rod has a substantially right angle bend 14 with an enlargement 15 thereon for the integral pin 15, by means of which enlargement 15 the rod can readily be pushed home into the tube 7 to properly position the lamp in groove 8 and to insert the pin 16 into a receiving bore 17 in the handle 1 to lock the rod in such completely inserted position. At its near end 18 and beyond the enlargement 15, the illuminating rod is preferably of an enlarged diameter and has a small conductive pin 19 extending radially therefrom, the end 18 being slightly so, as to protect away from the handle 1 with the pin 16 in bore 17. The insulated conductor 11 at the near end of the rod 10 terminates in an exposed contact 20 insulated from the outer metal of the rod 10 and the conductive pin 19. It will be noted then, that from the contact 20 through the conductor 11, socket 12 and metal rod 10 to the pin 19 there is a continuous conductive path for electrical energy to and from the lamp 13.

A formed metal housing 21, substantially cylindrical, has its upper end snugly fitted over the enlarged near end 18 of the illuminating rod and has a formed groove or slot 22 which is adapted to receive the conductive pin 19. The slot 22 extends substantially axially to the metal housing 21 and then along its cylindrical surface with a recess 23 upwardly at the end of its cylindrical portion so that, with the pin 19 in the recess 23, the housing 21 is locked to and in electrical conductive relation with the illuminating rod end 18. The upper end of the metal housing has a central conductor 24 supported by insulation 25 completely filling the region between the conductor 24 and the adjacent upper portion of the housing wall, so that with the pin 19 locked in the slot recess 23, the exposed contact 20 of the illuminating rod is in electrical contact with the conductor 24. Centrally disposed along the axis of the housing 21, a coil 26 of bare high resistance wire, having its adjacent turns insulated from each other, is wound over a rod 27 of insulating material of appropriate external diameter downwardly in to the housing interior a predetermined distance. The end of coil 26 adjacent to the central conductor 24, at the region where the insulation 25 ends, is connected there to the central conductor 24, preferably in the form of an enlarged disc portion 28 of the same external diameter as the coil 26, while the other end of the coil is anchored in an insulating disk 29 integral about the rod 27 and below the coil 26 and of the same external diameter. About the lower end region of the insulating core 27 there is disposed a hollow conductive cylinder 30 having an integral conductive bottom 31, the cylinder 30 being of the same external diameter as are the conductive disk 28, the coil 26 and the insulating disk 29. The positive pole of a mercury type battery 32 is pressed against the conductive bottom 31 by a conductive spring 33 acting between the negative pole bottom of the battery 32 and the removable bottom 34 of the housing 21.

A slot 35 in the cylindrical wall of the housing 21 parallel to the axis thereof, is of a length substantially equal to the sum of the heights of the insulating disk 29, half the height of the coil 26 and half the height of the conductive cylinder 30, and has its midregion vertically coplanar horizontally with the vertical midregion of the insulating disk 29. A sliding, bridge type of contact 36, of a length span axially between its contact making ends equal to slightly more than the length of the slot 35, is supported between a pair of insulating members 37 and 38 across the slot 35 and of a dimension in excess of the slot width, on the shoulder 39 of a metal center post 40, to the end of which post extending through the slot 35 on the exterior of the housing 21 an insulating knob 41, preferably peripherally knurled, is affixed. The insulating knob 41 has a depending bushing 42, also of insulating material and of a length at least equal to the thickness of the wall of housing 21. The upper face of the insulating knob is deeply recessed or dished centrally to receive the threaded bolt 43 which meshes with the threaded central bore 44 in post 40, by which bolt the shoulder 39 is tightened up against the lower one of the insulating members 37, the contact slider 36, the upper insulating member 38 and the bottom of the insulating bushing 42 in that order. Lengthwise the slot 35, as shown in Figure 6, the slider contact 36 has the springy arcuate ends 45 and 46 adapted readily to slide on the conductive cylinder 30, the insulation disk 29 and the surface of the turns of the coil 26, respectively. It is to be noted that the sum of the axial lengths of the conductive disk 28 and the coil 26 is not in excess of the axial length of the conductive cylinder 30, and is preferably somewhat less. To supply a positive guide in the region of the plane of the sliding of the ends 45 and 46 of the bridge slider 36, the conductive post 40 extends from the knob 41, and in electrical contact through the center of the slider 36 into an axial groove 47 in the surface of the conductive cylinder 30, the groove registering with slot 35. The end of the groove 47 thus acts as a stop when moving the knob 41 to the uppermost position in slot 35.

It follows that with the knob 41 in its lowest position in the slot 35, the lower end 45 of the slider 35 is on the conductive cylinder 30 while the upper end 46 thereof is on the insulation disk 29, so that the circuit is open. Moving the knob up slightly removes the upper end 46 from the insulating disk and moves it onto the coil 26, thus closing the circuit and inserting all of the high resistance of the coil, with the result that the lamp 13 burns dimly. Continuing to push the knob upwardly, more and more of the high resistance of the coil 26 is removed from the circuit, the lamp burning brighter and brighter until the upper end 46 of the slider engages the conductive disk 28 and the lamp burns at its maximum brightness. The axial length of the coil 26 and of the conductive disk 28 not being in excess of the axial length of the conductive cylinder 30, the lower end 45 of the slider does not leave the conductive cylinder 30 during such movement.

From Figure 3 particularly it will be noted that with the housing 21 locked in place to the enlarged illuminating rod end 18, the insulating knob 41 for controlling the slider to the "on", "off", and intermediate positions is so spatially disposed, because of the predetermined positioning of pin 19, slot 22 and recess 23 with respect to the slider slot 35, that it is readily controlled by the thumb of the user's right hand holding the instrument by handle 1.

The bronchoscope embodiment of Figure 1 includes an upper aspirator tube 48 radially aligned with handle 1 and provided with a hose nipple 49 and extending the length of tube 3, merging thereinto at the remote end to form an upper aperture 50. As an optional feature, a lateral aspirator tube 51 may be at some 135 degrees from the tube 48, substantially to the opposite side of the handle 1 from the enlarged end 18 of the illuminating rod, and is provided also with a hose nipple 52, extends the length of tube 3, and merges at the remote end into the tube 3 to form the lower port 53. A plurality of apertures 54 through the remote end region of the tube 3 are provided as air holes for ventilating the bronchial cavity.

In the second illustrative embodiment of our invention, in the form of a laryngoscope, shown in Figure 7, like reference characters identify elements identical with the particular elements of the first embodiment of Figures 1 through 6. The handle 55 is hollow in its vertical portion 56 and has a lateral cover 57, for example, hinged near its bottom 58 and opening to expose the interior of the handle in the direction opposite to that in which the inspection tube 59 extends from the vertical handle portion 56. A bore 60 extends from the interior of the handle portion 56 to the exterior, and laterally of the inspection tube 59, the tube 61 extends through the bore 60 to the remote end region of the inspection tube, gradually merging into it to form the longitudinal groove 62 in the interior surface of the inspection tube remote end region. A substantial portion of the top remote end region of the inspection tube is cut away as shown, while the remainder of the top region of such tube 59 is a cover member 63 slidable on the lower portion of tube 59, and may be completely removed if required.

Tube 61 is of an internal diameter adapted to receive an illuminating rod 10 of appropriate length to position the lamp 13 in the groove 62. The right angle bend 14 of the rod 10 is additionally bent forwardly so that with the pin 16 of the enlargement 15 in the bore 17' through the handle portion 56, the terminal enlargement 18 of the illuminating rod will be substantially coaxial with the hollow interior region defined by the vertical handle portion 56 and the lateral cover 57. The entire assembly of the metal housing 21 and its contents is attached to the terminal enlargement 18 by means of pin 19 of the illuminating rod and the slot recess 23 of the housing 21, fitting snugly into the so defined interior region with the lateral cover 57 closed and latched to the handle portion 56 by any well known means, not shown. A slot 64 registering vertically and horizontally with the slot 35 in the housing 21 passes through the wall of the vertical handle portion 56, and an extension insulating knob 65 extends therethrough and is attached by any readily attachable and detachable means, for example, a snugly fitting member 66 recessed to fit over knob 41, to the knob 41 so that on movement of the knob 65 in its slot 64 the knob 41 will correspondingly move in its slot 35, to produce the changes in the illumination of lamp 13 as above discussed in respect of the first illustrative embodiment.

The illustrative embodiments of our invention above described are solely by way of illustration and not in any way limiting, and numerous modifications can be made therein without departing from the spirit and scope of our instant invention.

What we claim is:

An examining instrument for deep internal cavities comprising a handle, a first elongated tube extending from the handle, a second elongated tube extending longitudinally along the first tube and of a diameter relatively small compared to that of the first tube, the remote end of the second tube merging into the first tube and forming an elongated groove in the inner surface of the first tube, a coaxial electrical line having an outer metal conductor fitted into the second tube, an incandescent lamp at the end of the coaxial line remote from the handle and positioned in the elongated groove, a portable casing detachably connected to the handle end of the coaxial line, a source of electrical energy within the casing for electrically connecting the source to the coaxial line, and an actuating member for the rheostat extending through the casing for manually actuating the rheostat from the handle to connect and disconnect the source to the line and to vary the amount of energy drawn therefrom in the rheostat connecting positions of the actuating member, said casing being of metal and in electric conductive relation with the outer conductor of the coaxial line, the source of electrical energy is a battery of which the negative pole is electrically connected to the casing, and the rheostat comprises a conductive cylinder of predetermined diameter connected to the positive pole of the battery, a coil of high resistance wire wound in turns of the predetermined diameter, one end of the coil being connected to the inner conductor of the coaxial line and the successive turns of the coil being insulated from each other, a disk of insulating material of the predetermined diameter interposed between the conductive cylinder and the coil, the conductive cylinder, the coil and the insulating disk being axially aligned and the axial length of the conductive cylinder being at least equal to the sum of the axial lengths of the coil and the disk, a slidable bridging member having an upper contact spaced from a lower contact in the axial direction a distance that with the lower contact still in contact with the conductive cylinder the upper contact thereof substantially shorts out of the connection to the inner conductor all the turns of the coil, and means for preventing the slidable bridging member from disengaging the conductive cylinder with both its upper and lower contacts.

References Cited in the file of this patent

UNITED STATES PATENTS

| 1,158,600 | Wappler | Nov. 2, 1915 |
| 2,479,237 | Held | Aug. 16, 1942 |
| 2,544,914 | Cameron | Mar. 13, 1951 |

FOREIGN PATENTS

| 680,219 | Great Britain | Oct. 1, 1952 |